(12) United States Patent
Christnacher et al.

(10) Patent No.: US 12,006,437 B2
(45) Date of Patent: Jun. 11, 2024

(54) FIBRE REACTIVE DYES, THEIR PREPARATION AND THEIR USE

(71) Applicant: Huntsman Textile Effects (Switzerland) GmbH, Basel (CH)

(72) Inventors: Hubert Jean Luc Christnacher, Dietwiller (FR); Fanny Ehret, Reiningue (FR); Michael Nicollet, Village-Neuf (FR); Jean-Christophe Graciet, Village-Neuf (FR); Georg Roentgen, Freiburg (DE)

(73) Assignee: Huntsman Textile Effects (Switzerland) GmbH, Basel (CH)

(*) Notice: Subject to any disclaimer, the term of this patent is extended or adjusted under 35 U.S.C. 154(b) by 0 days.

(21) Appl. No.: 17/629,810

(22) PCT Filed: Jun. 24, 2020

(86) PCT No.: PCT/EP2020/067678
§ 371 (c)(1),
(2) Date: Jan. 25, 2022

(87) PCT Pub. No.: WO2021/018485
PCT Pub. Date: Feb. 4, 2021

(65) Prior Publication Data
US 2022/0259435 A1 Aug. 18, 2022

(30) Foreign Application Priority Data
Jul. 29, 2019 (EP) .................... 19188794

(51) Int. Cl.
| | |
|---|---|
| C09B 62/255 | (2006.01) |
| C09B 67/22 | (2006.01) |
| C09D 11/328 | (2014.01) |
| D06P 3/66 | (2006.01) |

(52) U.S. Cl.
CPC ........ *C09B 62/255* (2013.01); *C09B 67/0042* (2013.01); *C09D 11/328* (2013.01); *D06P 3/666* (2013.01)

(58) Field of Classification Search
None
See application file for complete search history.

(56) References Cited

U.S. PATENT DOCUMENTS

| | | |
|---|---|---|
| 3,457,252 A | 7/1969 | Meininger |
| 4,649,193 A | 3/1987 | Meininger et al. |
| 4,885,360 A | 12/1989 | Scheibli |
| 7,132,517 B2 | 11/2006 | Schwaiger et al. |
| 2005/0241079 A1 | 11/2005 | Russ et al. |

FOREIGN PATENT DOCUMENTS

| | | |
|---|---|---|
| CN | 1659240 A | 8/2005 |
| DE | 3707549 A | 9/1988 |
| DE | 3707549 A1 | 9/1988 |
| EP | 0281898 B1 | 7/1991 |
| GB | 1155149 | 6/1969 |
| GB | 2239024 A | 6/1991 |
| WO | 93012181 A1 | 6/1993 |

*Primary Examiner* — Samantha L Shterengarts
(74) *Attorney, Agent, or Firm* — Christensen, Fonder, Dardi & Herbert PLLC; Elizabeth A. Gallo

(57) ABSTRACT

A reactive dye of formula

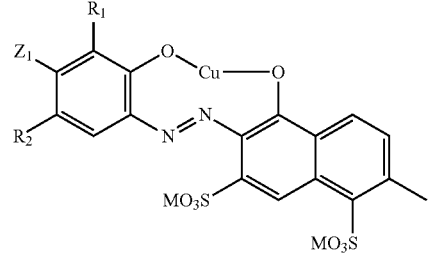

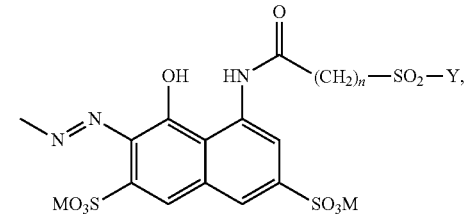

wherein
M is hydrogen, an alkali metal or one equivalent of an alkaline earth metal,
$Z_1$ is vinyl, β-sulfatoethyl or the radical —NHCO—(CH$_2$)$_3$—SO$_2$—CH$_2$CH$_2$Cl;
$R_1$ denotes H or sulfo; and
$R_2$ is H, methyl, methoxy or sulfo,
n is the number 3;
Y is vinyl or a radical —CH$_2$—CH$_2$-U and U is —Cl or —OSO$_3$H,
is suitable for dyeing and printing cellulosic or amide-group-containing fibre materials.

16 Claims, No Drawings

FIBRE REACTIVE DYES, THEIR PREPARATION AND THEIR USE

CROSS-REFERENCE TO RELATED APPLICATIONS

This application is the National Stage application filed under 35 U.S.C. § 371 of International Application No. PCT/EP2020/067678 filed Jun. 24, 2020, which designated the United States of America and which claims priority to European Patent Application No. 19188794.2 filed Jul. 29, 2019. The noted applications are incorporated herein by reference in their entirety.

The present invention relates to blue dyeing copper complex reactive dyes having two fibre reactive groups, to mixtures containing said copper complex dyes, to a process for the preparation thereof and to the use thereof in dyeing or printing textile fibre materials.

Fibre reactive copper complex dyes which can be used for the dyeing and printing of hydroxyl-group-containing or nitrogen-containing fibre materials, such as cotton or wool, are known and described, for example, in U.S. Pat. Nos. 4,885,360, 527,886, GB 2239024 and DE 3707549.

Nowadays reactive dyes are required that have sufficient substantivity and at the same time have good ease of washing off of unfixed dye. They should also have a good tinctorial yield and high reactivity, the objective being to provide especially dyeings and prints having high degrees of fixing. The dyes should also yield dyeings and prints having good all-round fastness properties, for example light-fastness and wet-fastness properties. The fibre reactive metal complex dyes hitherto known do not satisfy all these requirements. In particular, dyeings prepared with the known dyestuffs have insufficient wash- and chlorine fastness.

The problem underlying the present invention is accordingly to find, for the dyeing or printing of fibre materials, novel improved blue dyeing fibre reactive dyes having the qualities characterised above to a high degree.

The present invention accordingly relates to a reactive dye of formula wherein

M is hydrogen, an alkali metal or one equivalent of an alkaline earth metal, $Z_1$ is vinyl, β-sulfatoethyl or the radical —NHCO—(CH$_2$)$_3$—SO$_2$—CH$_2$CH$_2$Cl, $R_1$ denotes H or sulfo, and $R_2$ is H, methyl, methoxy or sulfo, n is the number 3, Y is vinyl or a radical —CH$_2$—CH$_2$-U and U is —Cl or —OSO$_3$H.

The dyes of formula (1) contain at least 3, preferably 3 to 5, and especially 4 or 5 sulfo groups. Sulfo groups —SO$_3$M are present either in free acid form (M is hydrogen) or, preferably, in salt form. Suitable salts are, for example, alkali metal or alkaline earth metal salts. Further salts which come into consideration are ammonium salts, salts of an organic amine, or mixtures thereof. Examples that may be mentioned are sodium, lithium, potassium or ammonium salts, a mono-, di- or tri-ethanolamine salt or mixed Na/Li or Na/Li/N H$_4$ salts.

$Z_1$ is preferably β-sulfatoethyl or —NHCO—(CH$_2$)$_3$—SO$_2$—CH$_2$CH$_2$Cl.

A preferred embodiment of the present invention relates to reactive dyes of formula (1), wherein $R_1$ denotes H.

In a certain embodiment Y is a radical —CH$_2$—CH$_2$-U and U is —Cl or —OSO$_3$H, preferably U is Cl.

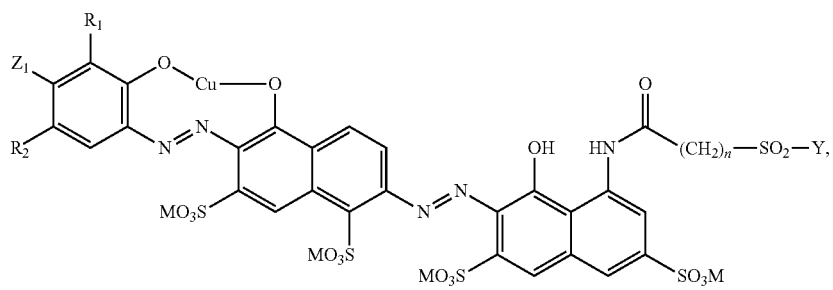

(1)

Particularly preferred are dyes of formula

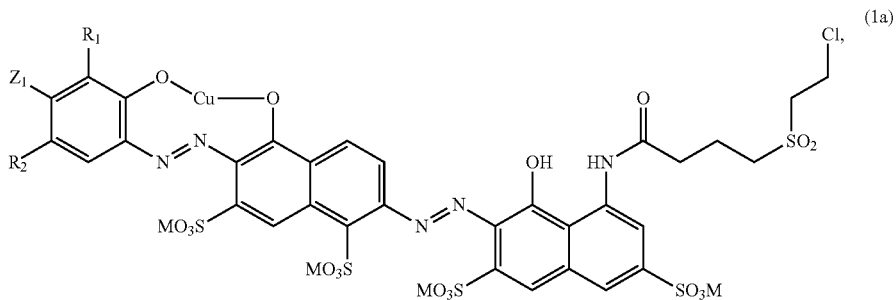

wherein

M is as defined above, $Z_1$ is β-sulfatoethyl or —NHCO—$(CH_2)_3$—$SO_2$—$CH_2CH_2Cl$, $R_1$ denotes H or sulfo, and $R_2$ is H, methyl, methoxy or sulfo.

The dyes according to the invention exhibit a high compatibility with other reactive dyes and can therefore be applied in combination with other dyes in order to adjust a specific shade or in dichromatic or trichromatic mixtures.

Accordingly, the invention further relates to a dye mixture comprising (A) 20-60% by weight, preferably 25 to 55% by weight, in particular 30 to 50% by weight, of one or more reactive dyes of formula (1), and (B) 40-80% by weight, preferably 45 to 75% by weight, in particular 50 to 70% by weight, of at least one blue, yellow, orange or brown dyeing reactive dye different from the dye of formula (1), each percentage being based on the sum total of all dyes.

Examples for dyes suitable as component (B) in the mixtures according to the invention are C.I. R BL 19, C.I. R BL 49, C.I. R BL 100, C.I. R BL101, C.I. R BL144, C.I. R BL 145, C.I. R BL 146, C.I. R BL 147, C.I. R BL 194, C.I. R BL 198, C.I. R BL 220, C.I. R BL 221, C.I. R BL 222, C.I. R BL 223, C.I. R BL 225, C.I. R BL 235, C.I. R BL 244, C.I. R BL 260, C.I. R BL 261, C.I. R BL 262, C.I. R BL 268, C.I. R BL 269, C.I. R BL 275, C.I. R BL 279, C.I. R BL 282, C.I. R BL 284, C.I. RYE 95, C.I. RYE 143, C.I. RYE 168, C.I. RYE 174, C.I. RYE 175, C.I. RYE 205, C.I. RYE 206, C.I. RYE 207, C.I. RYE 208, C.I. RYE 209, C.I. RYE 210, C.I. RYE 214, C.I. RYE 217, C.I. RYE 218, C.I. RYE 219, C.I. RYE 222, C.I. R OR 13, C.I. R OR 35, C.I. R OR 116, C.I. R OR 131, C.I. R OR 132, C.I. R OR 133, C.I. R OR 134, C.I. R OR 135, C.I. R OR 137, C.I. R OR 140 and C.I. R OR 143.

Preferably, the dye mixture according to the invention comprises one or more dyes selected from C.I. R BL 220, C.I. R BL 235, C.I. R BL 19 and C.I. R BL 279 as component (B).

The present invention further relates to a process for the preparation of the reactive dye of formula (1), which comprises (a) diazotising a compound of the formula

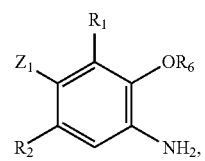

wherein $R_1$, $R_2$ and $Z_1$ have the meanings as defined above and $R_6$ denotes H or $C_1$-$C_6$alkyl; and reacting the diazonium salt so obtained with a coupling component of formula

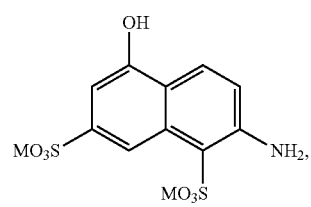

wherein M is as defined above;

whereby an azo compound of formula

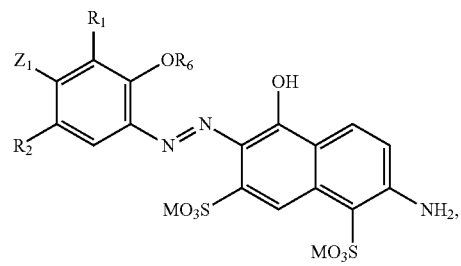

is obtained, wherein $R_1$, $R_2$, $Z_1$, $R_6$, M and p are as defined above;

(b) reacting a compound of formula

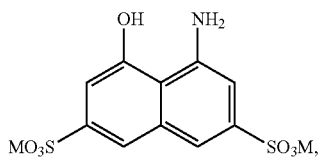

(6)

wherein M is as defined above,
with a compound of formula

(7), wherein Y and n are as defined above,
thereby providing a compound of formula

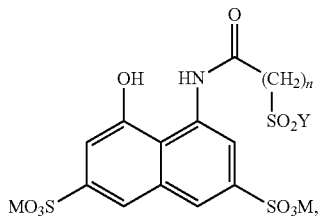

(8)

wherein M, Y and n are as defined above;
(c) diazotising the compound of the formula (5) prepared in step (a) and reacting the diazonium salt so obtained with the coupling component of formula (8) prepared in step (b); and
(d) reacting the bisazo dye prepared in step (c) with a Cu(II) salt in aqueous solution at pH<7 thus providing the copper complex dye of formula (1).

The educts of formulae (3), (4), (6) and (7) are known or can be prepared according to known methods.

Suitable compounds of formula (3) are, for example, 2-hydroxy-4-β-sulfatoethyl-1-aminobenzene, 2-hydroxy-5-methoxy-4-β-sulfatoethyl-1-aminobenzene, 2-hydroxy-5-methyl-4-β-sulfatoethyl-1-aminobenzene, 2-methoxy-4-β-sulfatoethyl-1-aminobenzene, 2-hydroxy-4-[4-(β-chloroethyl)butyrylamino]-1-aminobenzene and 2-methoxy-4-[4-(β-chloroethyl)butyrylamino]-1-aminobenzene.

In step (a) the amines of formula (3) are generally diazotised at low temperature in an aqueous mineral acid solution through the action of nitrous acid and the reaction with the coupling component of formula (4) is carried out at a weakly acid, neutral or weakly alkaline pH.

Specific examples for acid chlorides of formula (7) are: Cl—CO—(CH$_2$)$_3$—SO$_2$—(CH$_2$)$_2$—Cl and Cl—CO—(CH$_2$)$_3$—OS$_2$—CH=CH$_2$.

The compounds of formula (7) are known per se or can be prepared similarly to known compounds as described, for example in GB-A-1155149.

In step (b) the amine compound of formula (6) is preferably converted with the compound of formula (7) in aqueous solution, emulsion or suspension, at low temperature, for example 0° C. to 40° C., and at weakly acid, neutral or weakly alkaline pH. Advantageously, the hydrogen halide released in the course of the condensation reaction is continuously neutralized by the addition of aqueous alkali metal hydroxides, carbonates or bicarbonates.

In step (c) the intermediate of formula (5) is generally diazotised at low temperature in an aqueous mineral acid solution through the action of nitrous acid and the reaction with the coupling component of formula (8) is carried out at a weakly acid, neutral or weakly alkaline pH.

In step (d), finally, the bisazo dye prepared in step (c) is reacted with a Cu(II) salt in aqueous solution.

Suitable Cu(II) salts are, for example, the simple salts and the complex salts of copper, such as, for example, copper sulfate, copper chloride, copper acetate or copper carbonate, and the copper salts of salicylic acid or tartaric acid.

If the copper salts of mineral acids are used, it is expedient to carry out the reaction in the presence of an acid-buffering agent, such as, for example, an alkali metal hydroxide or carbonate or alkaline earth metal hydroxide or carbonate or an alkali metal salt of a lower alkanecarboxylic acid, such as acetic acid, or a basic alkali metal salt of phosphoric acid. These alkali metal compounds or alkaline earth metal compounds are, in particular, the sodium, potassium and calcium compounds, and preferably, for example, sodium hydroxide, potassium hydroxide, calcium hydroxide, sodium carbonate and potassium carbonate, calcium carbonate, sodium bicarbonate, sodium acetate, disodium hydrogen phosphate and trisodium phosphate.

The Cu(II) salt is used in about equimolar amounts, so that one copper atom is introduced per one molecule of the compound to be formed, of the formula (1). The metallization usually already goes to completion at room temperature.

Because the individual process steps mentioned above may be carried out in different orders as well as, where appropriate in some cases, simultaneously, different process variants are possible. The reaction is generally carried out in stepwise succession, the order of the simple reactions, known per se, between the individual reaction components being determined by the particular conditions.

The reactive dye of formula (1) according to the present invention is present either in the form of the free acid or, preferably, in the form of a salt thereof. Salts that come into consideration are, for example, the alkali metal, alkaline earth metal and ammonium salts or the salts of an organic amine. Sodium, lithium, potassium and ammonium salts and the salts of mono-, di- and tri-ethanolamine may be mentioned as examples.

The fibre-reactive dyes according to the invention are suitable for dyeing and printing, in particular for printing, a wide variety of materials, especially hydroxyl-group-containing or nitrogen-containing fibre materials. Examples include paper, silk, leather, wool, polyamide fibres and polyurethanes, and especially all types of cellulosic fibre materials. Such fibre materials are, for example, natural cellulose fibres, such as cotton, linen and hemp, and cellulose and regenerated cellulose. The dyes according to the invention are also suitable for dyeing or printing hydroxyl-group-containing fibres present in blend fabrics, for example blends of cotton and polyester fibres or polyamide fibres.

The present invention accordingly relates also to the use of reactive dyes according to the invention in the dyeing or printing of hydroxyl-group-containing or nitrogen-containing, especially cotton-containing, fibre materials, or in other words, a process for the dyeing or printing of hydroxyl-group-containing or nitrogen-containing fibre materials, wherein a reactive dye of formula (1) is used.

The reactive dyes according to the invention can be applied to the fibre material and fixed to the fibre in a variety of ways, especially in the form of aqueous dye solutions or dye print pastes. They are suitable both for the exhaust process and for dyeing in accordance with the pad-dyeing process; they can be used at low dyeing temperatures and require only short steaming times in the pad-steam process. The degrees of fixing are high and unfixed dye can be washed off readily, the difference between the degree of exhaust and the degree of fixing being remarkably small, that is to say the soaping loss is very small. The reactive dyes according to the invention are also suitable for printing, especially on cotton, and also for printing nitrogen-containing fibres, for example wool or silk or blend fabrics that contain wool.

The dyeings and prints produced using the reactive dyes according to the invention have a high tinctorial strength and a high fibre-dye binding stability in both the acidic and the alkaline range, and also good fastness to light and very good wet-fastness properties, such as fastness to washing, to water, to seawater, to cross-dyeing and to perspiration. In particular, the dyeings and prints obtained exhibit improved chlorine- and wash fastness properties compared to known dyes.

The dyes of formula (1) according to the invention are also suitable as colorants for use in recording systems. Such recording systems are, for example, commercially available ink-jet printers for paper or textile printing, or writing instruments, such as fountain pens or ballpoint pens, and especially ink-jet printers. For that purpose, the dyes according to the invention are first brought into a form suitable for use in recording systems. A suitable form is, for example, an aqueous ink, which comprises the dyes according to the invention as colorants. The inks can be prepared in customary manner by mixing together the individual components in the desired amount of water.

As substrates there come into consideration the above-mentioned hydroxyl-group-containing or nitrogen-containing fibre materials, especially cotton fibre materials. The fibre materials are preferably textile fibre materials.

Substrates that also come into consideration are paper and plastics films.

As examples of paper there may be mentioned commercially available ink-jet paper, photo paper, glossy paper, plastics-coated paper, e.g. Epson Ink-jet Paper, Epson Photo Paper, Epson Glossy Paper, Epson Glossy Film, HP Special Ink-jet Paper, Encad Photo Gloss Paper and Ilford Photo Paper. Plastics films are, for example, transparent or cloudy/opaque. Suitable plastics films are, for example, 3M Transparency Film.

Depending on the nature of the use, for example textile printing or paper printing, it may be necessary, for example, for the viscosity or other physical properties of the ink, especially properties that have an influence on the affinity for the substrate in question, to be adapted accordingly.

The dyes used in the aqueous inks should preferably have a low salt content, that is to say they should have a total content of salts of less than 0.5% by weight, based on the weight of the dyes. Dyes that have relatively high salt contents as a result of their preparation and/or as a result of the subsequent addition of diluents can be desalted, for example by membrane separation procedures, such as ultrafiltration, reverse osmosis or dialysis.

The inks preferably have a total content of dyes of from 1 to 35% by weight, especially from 1 to 30% by weight and preferably from 1 to 20% by weight, based on the total weight of the ink. The preferred lower limit in this case is a limit of 1.5% by weight, preferably 2% by weight and especially 3% by weight.

The inks may comprise water-miscible organic solvents, for example $C_1$-$C_4$alcohols, e.g. methanol, ethanol, n-propanol, isopropanol, n-butanol, sec-butanol, tert-butanol or iso-butanol; amides, e.g. dimethylformamide or dimethylacetamide; ketones or ketone alcohols, e.g. acetone or diacetone alcohol; ethers, e.g. tetrahydrofuran or dioxane; nitrogen-containing heterocyclic compounds, e.g. N-methyl-2-pyrrolidone or 1,3-dimethyl-2-imidazolidone, polyalkylene glycols, e.g. polyethylene glycol or polypropylene glycol; $C_2$-$C_6$alkylene glycols and thioglycols, e.g. ethylene glycol, propylene glycol, butylene glycol, triethylene glycol, thiodiglycol, hexylene glycol and diethylene glycol; other polyols, e.g. glycerol or 1,2,6-hexanetriol; and $C_1$-$C_4$alkyl ethers of polyhydric alcohols, e.g. 2-methoxy-ethanol, 2-(2-methoxyethoxy)ethanol, 2-(2-ethoxyethoxy)ethanol, 2-[2-(2-methoxyethoxy)ethoxy]ethanol or 2-[2-(2-ethoxyethoxy)ethoxy]ethanol; preferably N-methyl-2-pyrrolidone, diethylene glycol, glycerol or especially 1,2-propylene glycol, usually in an amount of from 2 to 30% by weight, especially from 5 to 30% by weight and preferably from 10 to 25% by weight, based on the total weight of the ink.

In addition, the inks may also comprise solubilisers, e.g. ε-caprolactam.

The inks may comprise thickeners of natural or synthetic origin, inter alia for the purpose of adjusting the viscosity.

Examples of thickeners that may be mentioned include commercially available alginate thickeners, starch ethers or locust bean flour ethers, especially sodium alginate on its own or in admixture with modified cellulose, e.g. methyl cellulose, ethyl cellulose, carboxymethyl cellulose, hydroxyethyl cellulose, methyl hydroxyethyl cellulose, hydroxypropyl cellulose or hydroxypropyl methyl cellulose, especially with preferably from 20 to 25% by weight carboxymethyl cellulose. Synthetic thickeners that may also be mentioned are, for example, those based on poly(meth)acrylic acids or poly(meth)acrylamides and also polyalkylene glycols having a molecular weight of, for example, from 2000 to 20 000, such as, for example, polyethylene glycol or polypropylene glycol or mixed polyalkylene glycols of ethylene oxide and propylene oxide.

The inks contain such thickeners, for example, in an amount of from 0.01 to 2% by weight, especially from 0.01 to 1% by weight and preferably from 0.01 to 0.5% by weight, based on the total weight of the ink.

The inks may also comprise buffer substances, e.g. borax, borates, phosphates, polyphosphates or citrates. Examples that may be mentioned include borax, sodium borate, sodium tetraborate, sodium dihydrogen phosphate, disodium hydrogen phosphate, sodium tripolyphosphate, sodium pentapolyphosphate and sodium citrate. They are used especially in amounts of from 0.1 to 3% by weight, preferably from 0.1 to 1% by weight, based on the total weight of the ink, in order to establish a pH value of, for example, from 4 to 9, especially from 5 to 8.5.

As further additives, the inks may comprise surfactants or humectants.

Suitable surfactants include commercially available anionic or non-ionic surfactants. As humectants in the inks according to the invention there come into consideration, for example, urea or a mixture of sodium lactate (advantageously in the form of a 50% to 60% aqueous solution) and glycerol and/or propylene glycol in amounts of preferably from 0.1 to 30% by weight, especially from 2 to 30% by weight.

Preference is given to inks having a viscosity of from 1 to 40 mPa·s, especially from 1 to 20 mPa·s and more especially from 1 to 10 mPa·s.

Furthermore, the inks may in addition comprise customary additives, e.g. anti-foams or especially preservatives that inhibit fungal and/or bacterial growth. Such additives are usually used in amounts of from 0.01 to 1% by weight, based on the total weight of the ink.

As preservatives there come into consideration formaldehyde-yielding agents, for example paraformaldehyde and trioxane, especially aqueous, approximately from 30 to 40% by weight formaldehyde solutions, imidazole compounds, for example 2-(4-thiazolyl)benzimidazole, thiazole compounds, for example 1,2-benzisothiazolin-3-one or 2-n-octyl-isothiazolin-3-one, iodine compounds, nitriles, phenols, haloalkylthio compounds or pyridine derivatives, especially 1,2-benzisothiazolin-3-one or 2-n-octyl-isothiazolin-3-one. A suitable preservative is, for example, a 20% by weight solution of 1,2-benzisothiazolin-3-one in dipropylene glycol (Proxel® GXL).

The inks may in addition comprise further additives, such as fluorinated polymers or telomers, for example polyethoxyperfluoroalcohols (Forafac® or Zonyl® products) in an amount of, for example, from 0.01 to 1% by weight, based on the total weight of the ink.

In the case of the ink-jet printing method, individual droplets of ink are sprayed onto a substrate from a nozzle in a controlled manner. It is mainly the continuous ink-jet method and the drop-on-demand method that are used for that purpose. In the case of the continuous ink-jet method, the droplets are produced continuously, droplets not required for the printing operation being discharged into a receptacle and recycled. In the case of the drop-on-demand method, on the other hand, droplets are generated as desired and used for printing; that is to say, droplets are generated only when required for the printing operation. The production of the droplets can be effected, for example, by means of a piezo ink-jet head or by thermal energy (bubble jet). Preference is given to printing by means of a piezo ink-jet head and to printing according to the continuous ink-jet method.

The present invention accordingly relates also to aqueous inks that comprise the dyes of formula (1) according to the invention and to the use of such inks in an ink-jet printing method for printing a variety of substrates, especially textile fibre materials, the definitions and preferences indicated above applying to the dyes, the inks and the substrates.

The dyes of the present invention show very good build-up behaviour, a high end build-up and a high degree of fixation, especially in printing applications on cellulosic fibre materials.

The following Examples serve to illustrate the invention. Unless otherwise indicated, the temperatures are given in degrees Celsius, parts are parts by weight and percentages relate to percent by weight. Parts by weight relate to parts by volume in a ratio of kilograms to litres.

EXAMPLE 1

(a) 62.2 parts of 2-methoxy-4-(β-sulfatoethylsulfonyl)-1-aminobenzene finely dispersed in 200 parts of water, are diazotized at pH<1.5 and 20° C. by addition of 17.5 parts of sodium nitrite. The reaction mixture is stirred for one hour and excess of nitrite is destroyed by addition of sulfamic acid.

(b) 63.9 parts of 2-amino-1,7-disulfo-5-hydroxynaphthalene are finely dispersed in 700 parts of water and pH is set up at 6.0 by use of sodium hydroxide 30% solution. By ice addition, temperature is kept by 5-20° C. Diazonium salt obtained in (i) is then added over 30 minutes by 5-20° C. while pH is kept at 6.0 by use of sodium hydroxide 30% solution.

(c) 63.9 parts of 1-amino-3,6-disulfo-8-naphthol are finely dispersed in 400 parts of water and 100 parts of ice. By use of sodium hydroxide 30% solution, pH is set up to 7.0. After addition of 300 parts of ice, 62.5 parts of β-chloroethylsulfonylbutyryl chloride are slowly added to the above solution by maintaining pH at 7.0-7.5 by the use of soda 20% solution and the temperature between 0-10° C.

(d) 150 parts of water, 150 parts of ice and 60 parts of hydrochloric acid (32%) are mixed together. To this, is slowly added a mixture of the compound obtained according to (b) and 17.5 parts of sodium nitrite by pH<1.5 and temperature at 0-15° C. The resulting mixture is the stirred 30 minutes. Excess of nitrite is destroyed by addition of sulfamic acid.

(e) the mixture obtained according to (d) is added over 1 hour at pH 6.5 and at a temperature of 0-20° C. to the mixture obtained according to (c) which is preliminary cooled with 150 parts of ice. pH is kept at value 6.5 by the use of sodium hydroxide 30% solution. After addition completion, the mixture is stirred for one additional hour.

(f) The mixture obtained according to (e) is combined with 32.2 parts of copper (II) chloride and pH is set up to value 4.5 by use of soda 20% solution. The resulting mixture is then stirred at pH 4.5 kept by use of soda 20% solution for 30 hours at 95-100° C. After reaction completion, the pH is the adjusted to 6.0 and the dyestuff obtained is isolated by methods commonly known in the art, for example, by desalting using a dialysis membrane. 305 parts of the crude dyestuff are obtained ($\lambda_{max}$; 576 nm) which main component, in the form of the free acid, corresponds to the formula

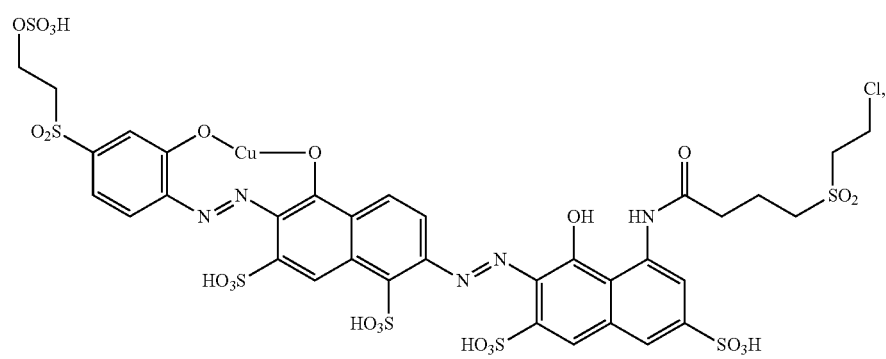

(101)

EXAMPLES 2-4
The following dyes, each of which dyes cellulose in a blue to violet shade with good all-round fastness properties, can be prepared in a manner analogous to that described in Example 1.
APPLICATION EXAMPLE 1
Pad Batch Dyeing
On a padder having a squeezing effect of 75% (70%) liquor pick-up, a bleached (mercerized) cotton cretonne
2
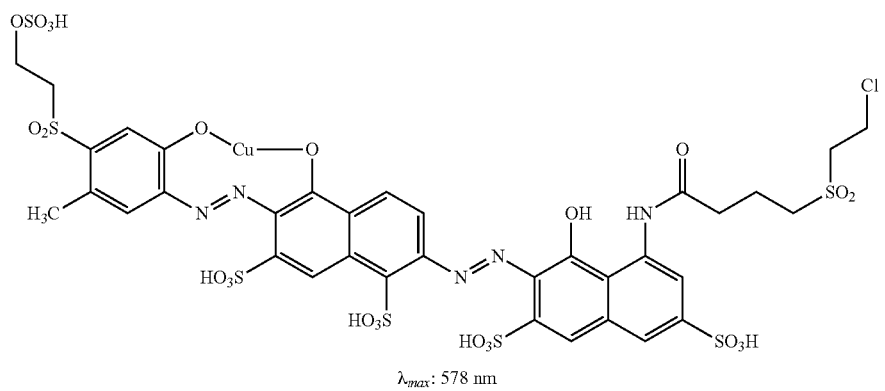
(102)
$\lambda_{max}$: 578 nm
3
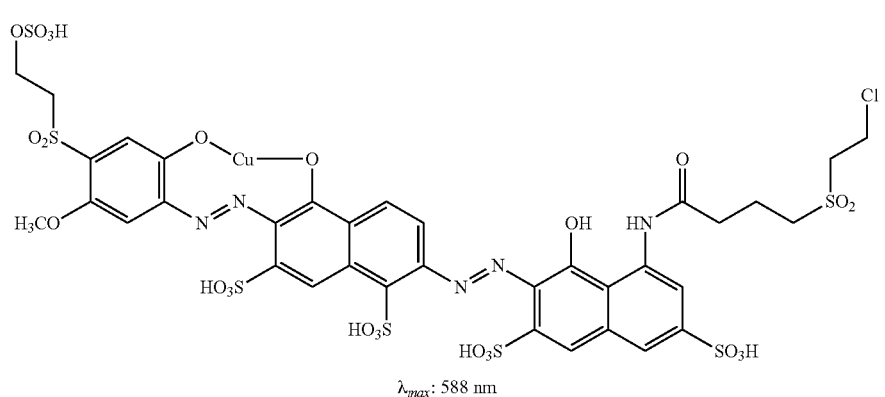
(103)
$\lambda_{max}$: 588 nm
4
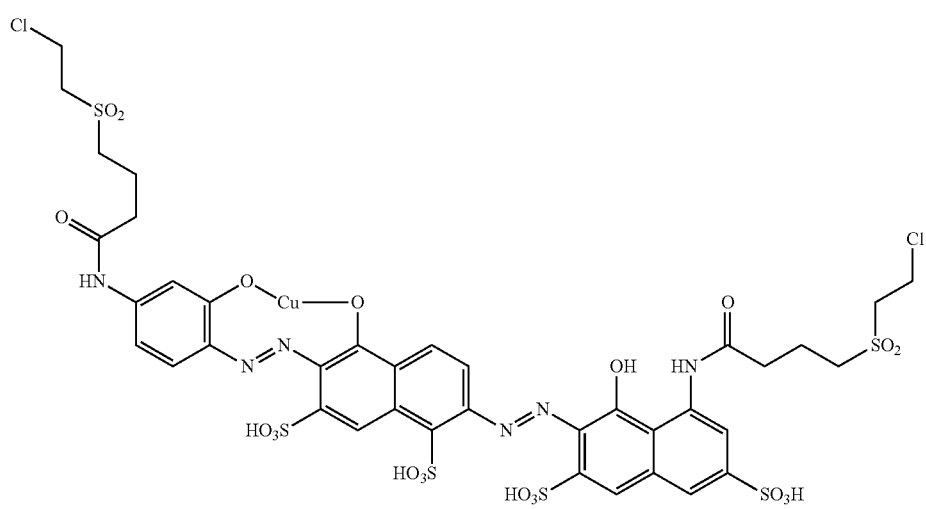
(104)

fabric is impregnated with an aqueous dyeing liquor containing, per litre, X g of the dyestuff of formula (104) obtained according to Example 4, 1 g of a wetting agent (ALBAFLOW® PAD), 20 ml (?) of sodium hydroxide 36° Bé and 70 ml of sodium silicate (water glass) 38° Bé. The immersion time is 2 seconds. After padding, the fabric is rolled up and then stored for 24 hours at a temperature of 25° C. After storage, the dyed cotton material is cold-rinsed with water (10 min), boiled in water (5 min) and subsequently cold-rinsed with water (10 min). Blue shaded fabrics of different colour depths are obtained with the dyeing liquors 1 to 3 dependent on the dyestuff concentration (X g/l).

The tinctorial strengths of the dyeings are measured photospectrometrically. Table 1 summarizes the build-up properties. The dyestuff prepared according to Example 4 shows very good build-up properties.

TABLE 1

| Build-up: dependence of reference depth (RD) from dyestuff concentration | | | |
|---|---|---|---|
| Dyebath | 1 | 2 | 3 |
| Dyestuff of Ex. 3 [X g/l] | 10 | 20 | 60 |
| Co cretonne bleached | 0.76 | 1.27 | 2.28 |
| Co cretonne mercerized | 1.12 | 1.88 | 3.11 |

APPLICATION EXAMPLE 2

As described in Application Example 1, a cotton cretonne fabric is dyed with a mixture comprising 30.0 parts by weight of a dye of formula (103) and 70.0 parts by weight of a dye of formula Blue shaded fabrics of different colour depths are obtained with the dyeing liquors containing different amounts of dye mixture dependent on the dyestuff concentration (X g/l).

The tinctorial strengths of the dyeings are measured photospectrometrically. Table 2 summarizes the build-up properties. The mixture of the dye of formula (103) and the dye of formula (901) shows very good build-up properties.

TABLE 2

| Build-up: dependence of reference depth (RD) from dyestuff concentration | | | | | | |
|---|---|---|---|---|---|---|
| Concentration of Dye Mixture [%] | 0.50 | 1.00 | 2.00 | 4.00 | 6.00 | 8.00 |
| Colour Depth | 0.35 | 0.64 | 1.19 | 2.14 | 2.64 | 3.15 |

A bleached cotton cretonne fabric dyed according to the above method with the mixture of 30% by weight of dye of formula (103) and 70% by weight of dye of formula (901) is subjected to xenon light fastness testing (ISO 105/E03). Changes in colour are determined according to the Grey Scale. The fabric is rated 4.

What is claimed is:

1. A reactive dye of formula

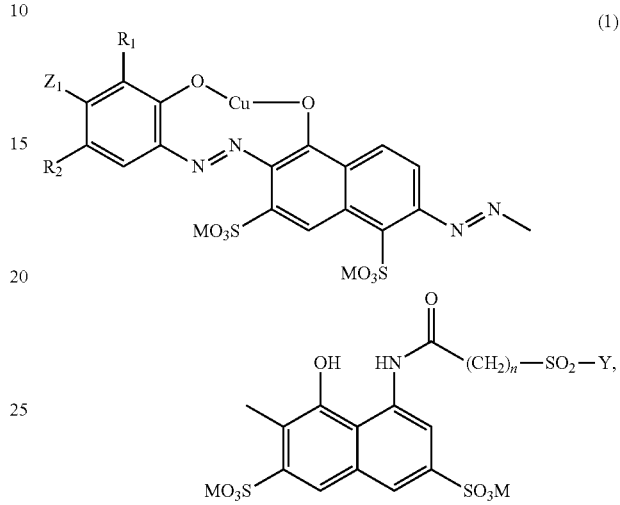

wherein

M is hydrogen, an alkali metal or one equivalent of an alkaline earth metal,

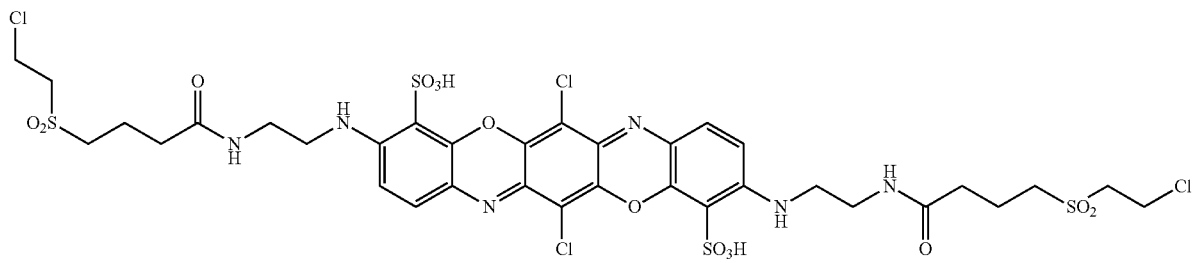

Z1 is vinyl, β-sulfatoethyl, β-sulfatoethylsulfonyl or the radical —NHCO—(CH$_2$)$_3$—SO$_2$—CH$_2$CH$_2$Cl, R1 denotes H or sulfo, and R2 is H, methyl, methoxy or sulfo, n is the number 3, Y is vinyl or a radical —CH$_2$—CH$_2$-U and U is —Cl or —OSO$_3$H.

2. The reactive dye of formula (1) according to claim 1, wherein Z1 is β-sulfatoethyl or —NHCO—(CH$_2$)$_3$—SO$_2$—CH$_2$CH$_2$Cl.

3. The reactive dye of formula (1) according to claim 1, wherein R$_1$ denotes H.

4. The reactive dye of formula (1) according to claim 1, wherein Y is a radical CH$_2$—CH$_2$-U and U is —Cl or —OSO$_3$H.

5. The reactive dye according to claim 1, wherein the reactive dye of formula (1) is a dye of formula

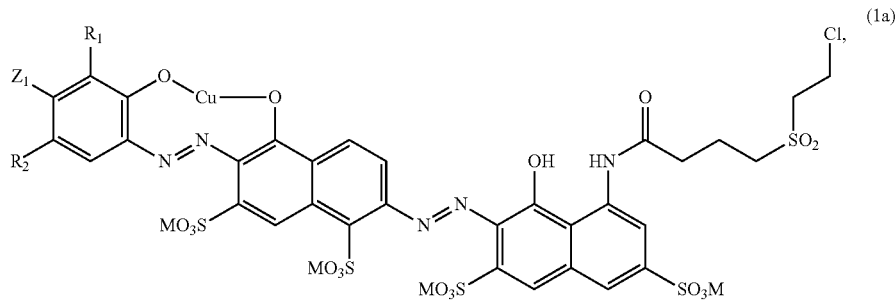

(1a)

wherein

M is as defined in claim 1,

Z1 is β-sulfatoethyl, β-sulfatoethylsulfonyl or —NHCO—(CH$_2$)$_3$—SO$_2$—CH$_2$CH$_2$Cl, R$_1$ denotes H or sulfo, and R$_2$ is H, methyl, methoxy or sulfo.

6. A dye mixture comprising:

(A) 20-60% by weight of one or more reactive dyes of formula (1) according to claim 1, and (B) 40-80% by weight of at least one blue, yellow, orange or brown dyeing reactive dye different from the dye of formula (1), each percentage being based on the sum total of all dyes.

7. The dye mixture according to claim 6 comprising one or more dyes selected from C.I. R BL 220, C.I. R BL 235, C.I. R BL 19 and C.I. R BL 279 as component (B).

8. A process for the preparation of the reactive dye of formula (1), which comprises:

(a) diazotising a compound of the formula

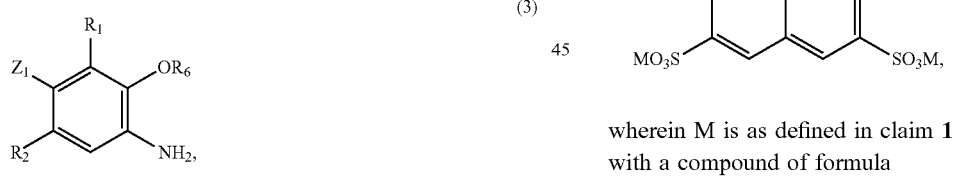

(3)

wherein R$_1$, R$_2$ and Z$_1$ have the meanings as defined in claim 1 and R$_6$ denotes H or C$_1$-C6 alkyl;

and reacting the diazonium salt so obtained with a coupling component of formula

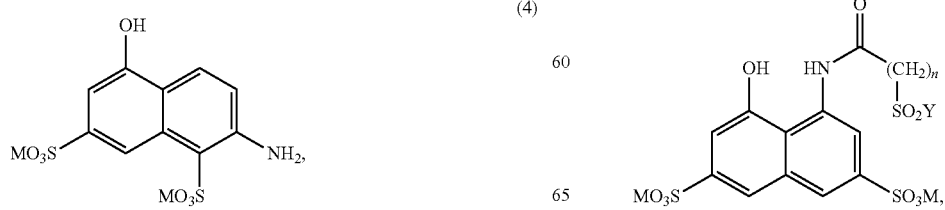

(4)

wherein M is as defined in claim 1;

whereby an azo compound of formula

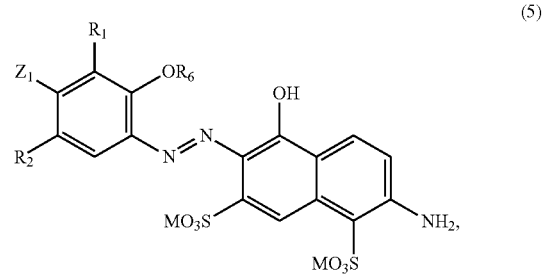

(5)

is obtained, wherein R$_1$, R$_2$, Z$_1$, R$_6$ and M are as defined in claim 1;

(b) reacting a compound of formula

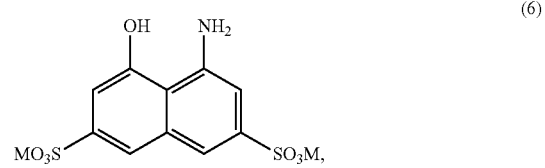

(6)

wherein M is as defined in claim 1, with a compound of formula

Cl—CO—(CH$_2$)$_n$—SO$_2$Y       (7), wherein Y and n are as defined in claim 1, thereby providing a compound of formula

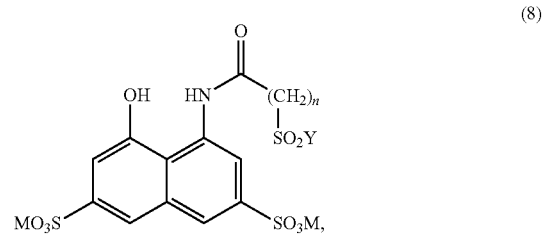

(8)

wherein M, Y and n are as defined in claim 1;
(c) diazotising the compound of the formula (5) prepared in step (a) and reacting the diazonium salt so obtained with the coupling component of formula (8) prepared in step (b); and
(d) reacting the bisazo dye prepared in step (c) with a Cu(II) salt in aqueous solution at pH <7 thus providing the copper complex dye of formula (1) according to claim 1.

9. A process for the dyeing or printing of hydroxyl-group-containing or nitrogen-containing fibre materials, wherein a reactive dye according to claim 1 or a mixture of reactive dyes according to claim 6 or 7 is used.

10. An aqueous ink comprising at least one dye of formula (1).

11. A reactive dye of formula

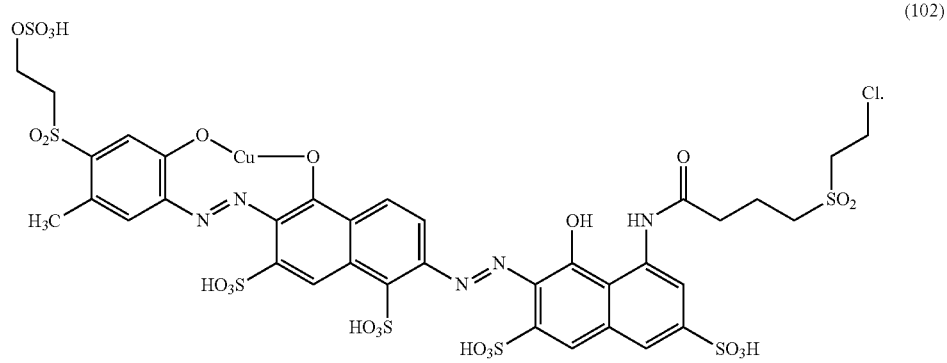

(102)

12. A process for the dyeing or printing of hydroxyl-group-containing or nitrogen-containing fibre materials, wherein the reactive dye according to claim 11 is used.

13. An aqueous ink comprising at least one dye according to claim 11.

14. A reactive dye of formula

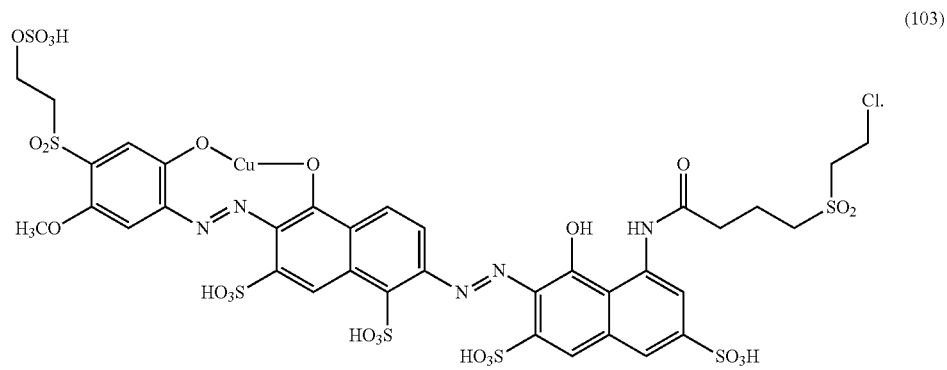

(103)

15. A process for the dyeing or printing of hydroxyl-group-containing or nitrogen-containing fibre materials, wherein the reactive dye according to claim 14 is used.

16. An aqueous ink comprising at least one dye according to claim 14.

\* \* \* \* \*